United States Patent [19]

Sawatzky et al.

[11] Patent Number: 5,225,159
[45] Date of Patent: Jul. 6, 1993

[54] DEODORIZATION OF SEWAGE SLUDGE-DERIVED OILS

[76] Inventors: Henry Sawatzky, 1982 Leslie, Ottawa, Ontario, Canada, K1H 5M3; Terrance Giddings, 1300 Richmond Road, Apt. 611, Ottawa, Ontario, Canada, K2B 8L2; Brian Farnand, 18 Norwich Way, Nepean, Ontario, Canada, K2G 5R3

[21] Appl. No.: 806,330

[22] Filed: Dec. 13, 1991

[51] Int. Cl.$^5$ .................... C10G 17/00; C10G 17/08
[52] U.S. Cl. ......................... 422/5; 554/205; 210/756; 210/916; 208/190; 208/223; 208/240; 208/254 R; 208/348; 208/362
[58] Field of Search ................ 422/5; 210/756, 916; 208/190, 223, 240, 254 R, 348, 362; 554/205

[56] References Cited

U.S. PATENT DOCUMENTS

| | | | |
|---|---|---|---|
| 1,999,041 | 4/1935 | Dunstan | 208/190 |
| 3,977,972 | 8/1976 | Bloch | 252/11 |
| 3,992,285 | 11/1976 | Hutchins | 208/208 R |
| 4,406,778 | 9/1983 | Borza et al. | 208/179 |
| 4,518,489 | 5/1985 | Hitzman | 208/223 |
| 4,522,707 | 6/1985 | Kriegel et al. | 208/180 |

FOREIGN PATENT DOCUMENTS

| | | |
|---|---|---|
| 506182 | 9/1954 | Canada . |
| 700946 | 12/1964 | Canada . |
| 1248902 | 1/1989 | Canada . |
| 252327 | 9/1927 | United Kingdom ............ 208/362 |
| 939699 | 10/1963 | United Kingdom ........ 208/254 R |

OTHER PUBLICATIONS

L. Hartman and Daniela Reimann as described in "Preparation of Medium Chain Triglycerides, With the Use of Physical Refining" in Fett Wissenshaft and Technologie, 1989, 91 (81 p. 324).

Primary Examiner—Robert J. Warden
Assistant Examiner—Stephanie Blythe
Attorney, Agent, or Firm—Martin J. Marcus

[57] ABSTRACT

A method is provided for treating a sewage sludge-derived oil having a particular chemical composition, to reduce its odor. The method includes the first step of distilling the sewage sludge-derived oil to 150° C. to remove water and volatile organic components, and then the essential step of circulating a gas consisting essentially of carbon dioxide gas therethrough.

4 Claims, No Drawings

DEODORIZATION OF SEWAGE SLUDGE-DERIVED OILS

BACKGROUND OF THE INVENTION (i) Field of the Invention

This invention relates to the treatment of sewage sludge-derived oils for the significant abatement of odours to allow for acceptability of utilization.

(ii) Description of the Prior Art

Sewage sludge-derived oil may be produced according to the teachings of Canadian Patent No. 1,225,062 issued Aug. 4th, 1987 to T. R. Bridle, contents of which being incorporated herein by reference. The teachings of such a patent may, however, be summarized as follows.

A batch-type reaction system for the production of such sludge-derived oil described in the above-identified Canadian patent may be operated as follows: A single reactor provides both heating and reaction zones and consists of a PYREX TM tube. This was heated in a furnace, off-gases being condensed in a trapping system consisting of three flasks connected in series, using ice as the coolant. Non-condensable gases (NCG) were vented by pipe from the system to a furnace hood and were not collected. A typical run was conducted by charging 550 g of dried sludge (93–96% solids) into the reactor and deaerating with nitrogen while in the vertical position. The reactor volumetric packing for all runs was a nominal 50%. The reactor was then placed in the furnace, which was inclined by a support 10° to facilitate liquid transport. All the lines, traps, etc. were connected and the entire system purged with nitrogen (15 mL/s) for 20 to 30 minutes. The furnace was then switched on and brought up to operating temperature at a controlled rate, the control employing a thermocouple placed in the sludge bed and connected to thermocouple switch and readout. Once operating temperature had been reached, the nitrogen purge rate was reduced to 7 mL/s. When all visible signs of reaction, i.e., gas/oil flow, ceased the heat was switched off and the nitrogen purge rate increased to 15 mL/s for approximately 30 minutes. The system was dismantled and the char, oil and pyrolytic water collected and stored for analyses, oil/water separation being achieved using a separatory funnel.

The operating conditions and results for a continuous-type reactor system are shown in Table 1 below, while typical elemental analyses of the resultant oils and chars are shown in Table 2 and a distribution analysis of aliphatic hydrocarbons found in an oil is shown in Table 3. The continuous reactor results are shown in Table 4. All the data in the tables is expressed on a total solids basis (not corrected for volatiles). The non-condensable gas (NCG) yield was calculated by difference. Analysis of the NCG, by gas chromatography (GC), indicated that it contained roughly 6% methane and 10% carbon monoxide with the remainder comprising mostly carbon dioxide and nitrogen. The calculated calorific value is approximately 2.0 MJ/kg of NCG.

Most of the test runs were conducted at optimum conditions defined as: optimum conversion temperature as determined by differential scanning calorimetry; linear increase of temperature with time to operating temperature at 10° C/minute; and continuous nitrogen purge. Runs 11, 12, 13, 22, 24 and 19 instead were conducted with one variable altered during each test, as indicated in Table 1.

TABLE 1

TEST RUN CONDITIONS AND RESULTS

| | OPERATING CONDITIONS | | | OIL | | |
|---|---|---|---|---|---|---|
| RUN NO. | SLUDGE SAMPLE | TEMP (°C.) | OTHER COMMENTS | YIELD % | CALORIC VALUE MJ/kg | VISCOSITY CENTISTOKES |
| 1,20,29 | C | 400 | Optimum | 20.8 | 36.40 | Solid |
| 5-10 | D | 450 | Optimum | 21.1 | 37.43 | 31.1 |
| 14,15,16 | B | 450 | Optimum | 24.1 | 33.13 | 60.5 |
| 2 | C | 425 | 63% WAS | 25.8 | 33.83 | 70.3 |
| 3 | C | 425 | 75% WAS | 28.6 | 34.13 | 97.5 |
| 4 | C | 425 | 88% WAS | 28.7 | 31.77 | 214.0 |
| 11,12,13 | B | 350 | Low Temperature | 12.8 | 33.32 | Solid |
| 22 | C | 450 | High Temperature | 22.3 | 38.87 | Solid |
| 23 | C | 400 | No N$_2$ purge during run | 19.8 | 38.00 | 44.9 |
| 24 | C | 400 | Ramp at 5 C./min. | 16.3 | 37.92 | Solid |
| 19 | C | 400 | 10000 ppm Ni spike | 20.9 | 33.98 | 63.4 |
| 31 | C | 400 | Second reactor, empty | 19.0 | 37.49 | Solid |
| 32 | C | 400 | Second reactor, char | 17.2 | 38.18 | 39.5 |
| 33 | C | 400 | Second reactor, catalyst | 19.0 | 37.49 | 31.0 |

RESULTS CHAR RUN

| RUN NO. | YIELD % | CALORIC VALUE MJ/kg | NONCONDENSABLES YIELD % | PYROLYTIC WATER YIELD % | THERMAL EFFICIENCY % |
|---|---|---|---|---|---|
| 1,20,29 | 59.5 | 9.86 | 11.6 | 8.1 | 81.9 |
| 5-10 | 52.5 | 10.68 | 13.2 | 13.1 | 77.7 |
| 14,15,16 | 53.7 | 10.08 | 13.3 | 8.8 | 83.2 |
| 2 | 57.1 | 11.35 | 12.2 | 4.9 | 87.2 |
| 3 | 56.7 | 11.63 | 10.1 | 4.6 | 90.8 |
| 4 | 54.6 | 10.65 | 8.9 | 7.8 | 82.4 |
| 11,12,13 | 65.6 | 12.00 | 10.3 | 11.2 | 79.3 |
| 22 | 54.6 | 9.39 | 12.1 | 11.0 | 80.4 |
| 23 | 59.1 | 10.51 | 12.2 | 8.9 | 80.1 |
| 24 | 62.7 | 11.24 | 10.3 | 10.7 | 76.9 |
| 19 | 60.8 | NA | 10.6 | 7.7 | 88.7 |
| 31 | 60.0 | 11.07 | 12.0 | 9.0 | 80.1 |
| 32 | 59.9 | 11.07 | 13.0 | 9.9 | 77.0 |

TABLE 1-continued
TEST RUN CONDITIONS AND RESULTS

| | | | | | |
|---|---|---|---|---|---|
| 33 | 56.8 | 10.01 | 14.8 | 9.4 | 75.0 |

NA = Not Available
*Solid defined as 214 centistokes
+Measured at room temperature (20-25° C.) of Table 5 measurement at 38° C. (ASTM standard)

TABLE 2
OIL AND CHAR ELEMENTAL ANALYSIS (%)

| | OIL | | | | | CHAR | | | | |
|---|---|---|---|---|---|---|---|---|---|---|
| Run No. | C | H | N | S | O | C | H | N | S | O |
| 20 | 78.00 | 10.10 | 3.99 | 0.75 | 6.18 | 25.45 | 1.97 | 2.79 | 1.39 | 11.90 |
| 9 | 78.74 | 10.17 | 3.45 | 0.41 | 6.37 | 26.02 | 1.61 | 3.01 | 1.16 | 12.70 |
| 15 | 77.39 | 9.70 | 4.95 | 0.83 | 6.90 | 24.53 | 1.22 | 2.84 | 0.74 | 9.26 |
| 22 | 77.92 | 10.20 | 3.99 | 0.61 | 6.51 | 22.53 | 1.34 | 2.54 | 1.52 | 12.54 |
| 23 | 78.00 | 10.30 | 3.42 | 0.74 | 7.00 | 23.83 | 1.70 | 2.59 | 1.44 | 11.55 |
| 24 | 77.91 | 10.44 | 3.87 | 0.74 | 6.48 | 24.76 | 1.85 | 2.83 | 1.33 | 12.37 |
| 19 | 79.07 | 10.06 | 4.66 | 0.53 | 7.07 | 23.36 | 1.56 | 2.76 | 1.48 | 13.25 |
| 31 | 76.92 | 10.15 | 4.11 | 0.65 | 6.89 | 26.53 | 2.13 | 2.80 | 1.31 | 11.94 |
| 32 | 79.76 | 10.25 | 4.19 | 0.56 | 5.84 | 25.97 | 1.98 | 2.80 | 1.34 | 11.63 |
| 33 | 79.30 | 10.41 | 3.49 | 0.34 | 5.84 | 24.22 | 1.62 | 2.74 | 1.50 | 11.35 |

TABLE 3
ALIPHATIC HYDROCARBON DISTRIBUTION IN OIL

| Compound | % |
|---|---|
| $C_{10}$ | 8 |
| $C_{10-15}$ | 30 |
| $C_{15-16}$ | 6 |
| $C_{16-17}$ | 5 |
| $C_{17-19}$ | 10 |
| $C_{19-20}$ | 10 |
| $C_{20-21}$ | 10 |
| $C_{21}$ | 21 |
| | 100 |

The sewage sludge-derived oil produced appears to be largely aliphatic with a moderate oxygen content but with nitrogen derived from proteins and fatty acid in the sewage sludge. The solid residue is 80% inorganic matter.

The above-described sewage sludge-derived oils may have the following composition:

| | General Range | Typical Range |
|---|---|---|
| Nitrogen: | about 2% to about 8% | about 3.4% to about 5% |
| Oxygen: | about 3% to about 12% | about 5.8% to about 6.9% |
| Sulphur: | about 0.1% to about 4% | about 0.3% to about 0.8% |

TABLE 4
CONTINUOUS REACTOR RESULTS

| | REACTOR CONDITIONS | | | | | | OIL | | |
|---|---|---|---|---|---|---|---|---|---|
| Run No. | Temp (°) | Sludge Fd Rt (g/h) | Solids Residence Time (Min) | Char Inv. (g) | Gas Seal | Gas Path | Yield (%) | Cal. Value | Viscosity |
| 34 | 350 | 750 | 8 | 51 | no | mixed flow | 18.53 | 27.88 | 160 |
| 35 | 450 | 750 | 8 | 54 | no | mixed flow | | 29.71 | 31.12 |
| 36 | 500 | 750 | 8 | 53 | no | mixed flow | | 28.16 | 34.01 |
| 37 | 450 | 750 | 28 | 201 | yes | counter current | | 24.10 | 35.53 |
| 38 | 450 | 750 | 8 | 56 | no | 1st zone only | | 24.46 | 30.06 |
| 39 | 450 | 750 | 8 | 55 | no | co-current | | 27.96 | 33.20 |
| 40 | 450 | 1000 | 8 | 70 | yes | counter current | | 26.75 | 31.04 |
| 41 | 450 | 500 | 20 | 88 | yes | counter current | | 23.74 | 35.00 |

| | CHAR | | NOG | | | | | |
|---|---|---|---|---|---|---|---|---|
| Run No. | Yield (%) | Cal. Value | Yield (%) | Cal. Value | Phys. Water Yield | (%) | Thermal Effic'y | Char In SFR |
| 34 | 64.68 | 8.84 | 7.28 | 3.18 | 3.62 | | 73.85 | 0.068 |
| 35 | 72 | 59.76 | 8.27 | 7.57 | 5.04 | 2.18 | 96.80 | 0.072 |
| 36 | 34 | 58.10 | 7.67 | 3.61 | 20.05 | 3.06 | 98.04 | 0.071 |
| 37 | 33 | 59.50 | 8.28 | 6.37 | 9.68 | 5.72 | 93.77 | 0.268 |
| 38 | 110 | 59.47 | 8.25 | 9.26 | 3.72 | 4.23 | 83.75 | 0.075 |
| 39 | 73 | 59.74 | 8.70 | 6.67 | 6.07 | 5.60 | 98.91 | 0.073 |
| 40 | 82 | 61.11 | 8.54 | 4.76 | 7.20 | 3.37 | 92.14 | 0.070 |
| 41 | 34 | 57.79 | 8.12 | 7.42 | 10.96 | 5.88 | 91.82 | 0.176 |

Measured at 38° C. (ASTM standard) of Table 1 measurement at room temperature
Conducted using sludge from source "C"

-continued

| | General Range | Typical Range |
|---|---|---|
| Hydrogen: | about 8% to about 11% | about 9.7% to about 10.4% |
| Carbon: | about 86.9% to about 65% | about 76.9% to about 79.8% |

These sewage sludge-derived oils can be dehydrated by distillation. Portions of the nitrogenous groups appear to be amines and amides with some pyridinic and pyrrolic types. Portions of the oxygen-containing groups appear to be carboxylic and amide types.

The following Table provides an identification of individual components of sewage sludge-derived oil (SDO) by Gas Chromatography (GC) mass Spectrograph (MS):

| Components | Approximate concentration in Fraction | Approximate concentration in dehydrated sewage sludge-derived oil |
|---|---|---|
| Fraction 1 (boiling: up to 176° C.) (4.6% of dehydrated sewage sludge-derived oil) | | |
| Low boiling aromatics | 15.3% | 0.7% |
| Pyridines | 1.1% | 0.05% |
| Total Alkanes | 2.5% | 0.12% |
| Indoles | 1.7% | 0.08% |
| Pyrroles | 1.1% | 0.05% |
| Thiocyanates | traces (i.e. less than 0.05%) | |
| Esters | traces (i.e. less than 0.05%) | |
| Fraction 2 (boiling range: 176°–260° C.) (22.5% of dehydrated sewage sludge-derived oil) | | |
| Phenols | 3.2% | 0.7% |
| Pyrroles | | |
| Esters/acids | | |
| Succinimide ($C_5H_7NO_2$) | | |
| Amides | traces (i.e. less than 0.05%) | |
| Thioureas | traces (i.e. less than 0.05%) | |
| Thiazoles | traces (i.e. less than 0.05%) | |
| Fraction 3 (boiling range: 260–400° C.) (30.6% of dehydrated sewage sludge-derived oil) | | |
| $C_nH_{2n-1}NO$ | | |
| $C_nH_{2n-1}N$. | | |

It was found that, as the fractions get heavier, the identification of individual components becomes more difficult because of the complexity of the fraction.

The actual analysis of this SDO is
N: 6.77%
O: 11.21%
S: 0.74%
H: 9.75%
C: 71.53%

It has previously been found that the sewage sludge-derived oils have considerable potential as beneficial additives in asphalt. The use of sewage sludge-derived oil for asphalt pavement is disclosed in copending application Ser. Nos. 07/641,861, now abandonded, and 07/641,872, now abandoned, each filed 16 Jan. 1991. Unfortunately, these sewage sludge-derived oils are highly odourific and this would be a deterring factor for this attractive utilization outlet. Therefore, significant odour abatement of these oils would improve their commercial utility.

The reduction of odours of vegetable oils by circulating carbon dioxide through such oils during steam distillation has been achieved by others, in particular, by L. Hartman and Daniela Reimans as described in "Preparation of Medium Chain Glyceride, With Use of Physical Refining" in Fett Wissenshaft and Technologie 1989, 91 (81 p 324).

The patent literature also discloses procedure for removing undesirable materials from organic materials. For example, U.S. Pat. No. 3,977,972 patented Aug. 31, 1976, by H. P. Bloch, provided a method and apparatus for reclaiming contaminated liquid, e.g. seal oil. The procedure provided for the reduction of $H_2S$ by bubbling gas through it, e.g. nitrogen or air.

U.S. Pat. No. 3,992,285 patented Nov. 16, 1976, by L. E. Hutchins, provided a process for the conversion of hydrocarbonaceus black oil. The patented process involved desulphurization using a steam-containing gas and a desulfurization catalyst.

U.S. Pat. No. 4,406,778 patented Sep. 27, 1983, by M. Borza et al, provided a spent oil recovery process. The patented process involved the extraction and removal of insolubles from the oil using a gas under supercritical conditions.

U.S. Pat. No. 4,522,707 patented Jun. 11, 1985, provided, by E. Kriegel et al, a method for processing used oil. The patented process involved the extraction of used spindle and neutral oils with a gas under supercritical conditions.

U.S. Pat. No. 4,518,489 patented May 21, 1985, by D. O. Hitzman, provided an oil treatment process.

That patent provided a process for treating hydrocarbon oils in order to separate nitrogenous substances, as well as other contaminants. The process included the first step of contacting the oil in the presence of water with an acid gas which has an affinity for nitrogenous substances under specified conditions. The conditions included temperature in the range of about 20° to about 90° C., sufficient pressure and contacting with an immiscible phase, e.g. water, an immiscible solvent or mixtures thereof. This was effective to provide removal of nitrogen-containing compounds. The second step involved separating the immiscible phase containing nitrogen-containing compounds from the hydrocarbon oils. In this way, basic nitrogen-containing compounds were removed from mineral oil, e.g. shale oil, by extraction with an immiscible aqueous phase containing an acid gas, e.g. carbon dioxide. The effectiveness of the separation was proportional to the partial pressure of the gas.

That patentee further taught that organic compositions suitable for treatment by the recited process were any nitrogen-containing compounds, particularly primary, secondary, and tertiary amines and heterocyclic compounds, e.g. pyrrole, pyridine, indole, quinoline, etc., and their derivatives. Oil-based materials which could be treated by that invention included shale oil, petroleum, and liquid products from tar sands and coal and lignite liquefaction.

In view of the above-described technology and patents, there is thus an ever present need for the treatment of various carbonaceous compositions to remove undesirable components therefrom. Many expedients, as above described, have been advanced to treat various oil fractions. Examples of such treatment include the purification of mineral oils and other carbon-containing materials containing undesirable contaminants; the extraction of mineral oils to remove therefrom nitrogen-containing compounds and other impurities by extraction; the use of a $CO_2$ or other acidic gases as extractants for the removal of contaminants from various organic compositions containing same; and the treatment of oils and other organic compositions containing nitrogen-containing compounds and undesirable contaminants, to render the oils and/or the nitrogen-containing compounds more desirable.

However, none of the above-described compositions is a sewage sludge-derived oil nor are they the art-recognized equivalent thereof. Moreover, the procedures taught are for the removal of nitrogenous compounds and not necessarily for the removal of odouriferous compounds therein.

SUMMARY OF THE INVENTION (i) Aims of the Invention

The principal object of the present invention is to provide a method for the odour abatement of sewage sludge-derived oils to improve their acceptability for commerical utilization.

(ii) Statement of Invention

A method is provided herein for the significant reduction of odour of sewage sludge-derived oil in order to render the oils more acceptable for commerical utilization in such applications as for beneficial additives to asphalt, by steps of (A) distilling the sewage sludge-derived oil to a temperature of about 150° C. to remove water and volatile organic compounds and (B) circulating a gas consisting essentially of carbon dioxide therethrough.

(iii) Other Features of the Invention

The sewage sludge-derived oils have the general composition range, typical range, specific composition and individual components as described hereinbefore.

Thus in one feature, the sewage sludge-derived oil has the following range elemental composition:
Nitrogen: about 3.4% to about 5.0%
Oxygen: about 5.8% to about 6.9%
Sulphur: about 0.3% to about 0.8%
Hydrogen: about 9.7% to about 10.4%
Carbon: about 76.9% to about 79.8%.

In another feature of the invention, the sewage sludge-derived oil has the following elemental composition:
Nitrogen: 6.77%
Oxygen: 11.21%
Sulphur: 0.74%
Hydrogen: 9.75%
Carbon: 71.53%

By a still further feature of the invention, the individual components is the sewage sludge-derived oil have the following analysis, by gas chromatography:

| Components | Approximate concentration in Fraction | Approximate concentration in dehydrated sewage sludge-derived oil |
|---|---|---|
| Fraction 1 (boiling: up to 176° C.) (4.6% of dehydrated sewage sludge-derived oil) | | |
| Low boiling aromatics | 15.3% | 0.7% |
| Pyridines | 1.1% | 0.05% |
| Total Alkanes | 2.5% | 0.12% |
| Indoles | 1.7% | 0.08% |
| Pyrroles | 1.1% | 0.05% |
| Thiocyanates | traces (i.e. less than 0.05%) | |
| Esters | traces (i.e. less than 0.05%) | |
| Fraction 2 (boiling range: 176°–260° C.) (22.5% of dehydrated sewage sludge-derived oil) | | |
| Phenols | 3.2% | 0.7% |
| Pyrroles | | |
| Esters/acids | | |
| Succinimide ($C_5H_7NO_2$) | | |
| Amides | traces (i.e. less than 0.05%) | |
| Thioureas | traces (i.e. less than 0.05%) | |
| Thiazoles | traces (i.e. less than 0.05%) | |
| Fraction 3 (boiling range: 260–400° C.) (30.6% of dehydrated sewage sludge-derived oil) | | |
| $C_nH_{2n-1}NO$ | | |
| $C_nH_{2n-1}N$. | | |

DESCRIPTION OF PREFERRED EMBODIMENT

Examples 1-21

Oil was obtained from the pyrolysis of sewage sludge. This sewage sludge-derived oil was then distilled to 150° C. to remove the water and volatile organic components. The remaining phase was then subjected to the following twenty-one treatments. The results were determined and was evaluated by a panel of seven persons. Critical comparisons of levels of odours were made and the results were averaged. The results are summarized below in Table 5.

TABLE 5

| Treatment | Results |
|---|---|
| 1. None | Poor |
| 2. Steam Distillation | Poor |
| 3. $CO_2$ gas circulation | Good |
| 4. Steam Distillation + $CO_2$ gas circulation | Good |
| 5. Air circulation | Poor |
| 6. Nitrogen gas circulation | Poor |
| 7. High Pressure $CO_2$ (no stirring) | Poor |
| 8. High Pressure $CO_2$ (no stirring), 100° C. | Poor |
| 9. Wash with aqueous $H_2O_2$ (1%) | Fair |
| 10. Wash with aqueous NaOCL (0.1N) | Fair |
| 11. Wash with aqueous NaOCL (0.1N) and $CO_2$ circulation | Good |
| 12. Wash with aqueous $Na_2SO_3$ (0.1N) | Fair |
| 13. Wash with aqueous Acetic acid (0.1N) | Poor |
| 14. Wash with aqueous CaO (0.1N) | Poor |
| 15. Wash with aqueous NaOH (0.1N) | Poor |
| 16. Wash with aqueous $NaHCO_3$ (0.1N) | Poor |
| 17. Wash with aqueous $FeCL_3$ (0.1N) | Poor |
| 18. Activated Charcoal (5%) | Poor |
| 19. Strong Acid Ion Exchange Resin (5%) | Poor |
| 20. Weak Acid Ion Exchange Resin (5%) | Poor |
| 21. Strong Base Ion Exchange Resin (5%) | Poor |

As can be seen from treatment #2, steam distillation had little effect on odour reduction. However, bubbling carbon dioxide $CO_2$ through the SDO at ambient temperature was quite effective in reducing the odour as shown in treatment #3. Since steam distillation could be used in the production of SDO its combination with $CO_2$ circulation was tested and was also successful in odour reduction.

The significant odour reduction cannot be achieved solely by the sweeping action of gases as can be seen by treatments #5 and #6 in which air and nitrogen were circulated though the SDO without success. Treatment of the SDO with static carbon dioxide was unsuccessful as shown by treatments #7 and #8 in which the SDO was treated with $CO_2$ under pressure at both ambient and at 100° C.

Treatment with dilute aqueous oxidizing agents such as sodium hypochlorite (bleach) and hydrogen peroxide as shown in treatments #9 and #10 produced some odour reduction. However, when in combination with $CO_2$ as shown in treatment #11, the odour reduction was enhanced.

Treatment with dilute aqueous sodium sulphite as shown in #2 also resulted in some odour reduction.

Treatment with dilute aqueous acids and bases resulted in no significant odour reduction. Thus as shown in treatments #13, #14, #15, and #16 with acetic acid, calcium oxide (lime), sodium hydroxide and sodium bicarbonate resulted in no significant improvement. Neither did an aqueous solution of iron chloride as shown in #17.

In all the treatment with aqueous solutions, the volumes of the solutions used were twice those of the SDO.

Treatments with 5% of activated charcoal #18, 5% strongly acidic, #19, and weakly acidic #20 ion exchange resins and with 5% strongly basic ion exchange resins #21 resulted in no significant odour reduction.

These results indicate that passing $CO_2$ through sewage sludge-derived oils cause the odour to become more acceptable, as judged by the volunteer panel. Other treatments that used $CO_2$ gas were also suitable. Only trace amounts of materials were removed from the sewage sludge-derived oil.

When the sewage sludge-derived oil was added to hot recycled asphalt pavement at approximately 0.3% the odour was very strong. When sewage sludge-derived oil, that has had $CO_2$ passed through it, according to the process of the present invention, was added at approximately 0.3% to hot recycled asphalt pavement, the odour was significantly reduced. The beneficial effects on asphalt were also retained.

These examples demonstrate the effectiveness of passing $CO_2$ through sewage sludge-derived oil to reduce the odour.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A method for treating a sewage sludge-derived oil comprising the steps of:
(A) providing sewage sludge-derived oil having the following elemental composition:
   Nitrogen: about 2% to about 8%
   Oxygen: about 3% to about 12%
   Sulphur: about 0.1% to about 4%
   Hydrogen: about 8% to about 11%
   Carbon: about 86.9% to about 65%;
(B) distilling said sewage sludge-derived oil to a temperature of about 150° C. to remove water and volatile organic compounds; and
(C) circulating a gas consisting essentially of carbon dioxide therethrough.

2. The method of claim 1 wherein said sewage sludge-derived oil has the following range of elemental composition:
   Nitrogen: about 3.4% to about 5.0%
   Oxygen: about 5.8% to about 6.9%
   Sulphur: about 0.3% to about 0.8%
   Hydrogen: about 9.7% to about 10.4%
   Carbon: about 76.9% to about 79.8%.

3. The method of claim 1 wherein said sewage sludge-derived oil has the following elemental composition:
   Nitrogen: 6.77%
   Oxygen: 11.21%
   Sulphur: 0.74%
   Hydrogen: 9.75%
   Carbon: 71.53%

4. The method of claim 1 wherein the individual components of said sewage sludge-derived oil having the following analysis, by gas chromatography:

| Components | Approximate concentration in Fraction | Approximate concentration in dehydrated sewage sludge-derived oil |
| --- | --- | --- |
| Fraction 1 (boiling: up to 176° C.) (4.6% of dehydrated sewage sludge-derived oil) | | |
| Low boiling aromatics | 15.3% | 0.7% |
| Pyridines | 1.1% | 0.05% |
| Total Alkanes | 2.5% | 0.12% |
| Indoles | 1.7% | 0.08% |
| Pyrroles | 1.1% | 0.05% |
| Thiocyanates | | traces (i.e. less than 0.05%) |
| Esters | | traces (i.e. less than 0.05%) |
| Fraction 2 (boiling range: 176°–260° C.) (22.5% of dehydrated sewage sludge-derived oil) | | |
| Phenols | 3.2% | 0.7% |
| Pyrroles | | |
| Esters/acids | | |
| Succinimide ($C_5H_7NO_2$) | | |
| Amides | | traces (i.e. less than 0.05%) |
| Thioureas | | traces (i.e. less than 0.05%) |
| Thiazoles | | traces (i.e. less than 0.05%) |
| Fraction 3 (boiling range: 260–400° C.) (30.6% of dehydrated sewage sludge-derived oil) | | |
| $C_nH_{2n-1}NO$ | | |
| $C_nH_{2n-1}N$. | | |

* * * * *